(12) United States Patent
Murakami

(10) Patent No.: US 10,614,369 B2
(45) Date of Patent: Apr. 7, 2020

(54) MACHINE LEARNING DEVICE AND USER IDENTIFICATION DEVICE

(71) Applicant: FANUC CORPORATION, Minamitsuru-gun, Yamanashi (JP)

(72) Inventor: Keisuke Murakami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 36 days.

(21) Appl. No.: 16/018,177

(22) Filed: Jun. 26, 2018

(65) Prior Publication Data

US 2019/0034818 A1   Jan. 31, 2019

(30) Foreign Application Priority Data

Jul. 28, 2017   (JP) .................................. 2017-146715

(51) Int. Cl.
*G06N 7/02*   (2006.01)
*G06F 21/44*   (2013.01)
(Continued)

(52) U.S. Cl.
CPC .............. *G06N 7/023* (2013.01); *B25J 19/06* (2013.01); *G06F 21/316* (2013.01); *G06F 21/44* (2013.01);
(Continued)

(58) Field of Classification Search
CPC .................................. G06F 21/31; G06N 3/008
(Continued)

(56) References Cited

U.S. PATENT DOCUMENTS

2002/0024312 A1   2/2002 Takagi
2006/0095158 A1   5/2006 Lee et al.
(Continued)

FOREIGN PATENT DOCUMENTS

CN   104950702   9/2015
CN   106203019   12/2016
(Continued)

OTHER PUBLICATIONS

Notification of Reasons for Refusal dated May 7, 2019 in corresponding Japanese Application No. 2017-146715.
(Continued)

*Primary Examiner* — David R Vincent
(74) *Attorney, Agent, or Firm* — Wenderoth, Lind & Ponack, L.L.P.

(57) ABSTRACT

A machine learning device capable of preventing spoofing of an operator to secure safety during an operation of a robot is provided. A machine learning device includes: an input data acquisition means that acquires, as input data, operation data including a measurement value related to a movement of at least a portion of a body of the operator and a shape of the body, detected when the operator is caused to perform a predetermined operation associated with a training operation panel of the robot controller; a label acquisition means that acquires identification information of the operator as a label; and a learning means that constructs a learning model that performs user identification for authenticating operators of the robot controller by performing supervised learning using a pair of the input data and the label as training data.

13 Claims, 7 Drawing Sheets

(51) Int. Cl.
    *G06K 9/62* (2006.01)
    *G06N 20/00* (2019.01)
    *G06N 20/10* (2019.01)
    *B25J 19/06* (2006.01)
    *G06F 21/31* (2013.01)
    *G06K 9/00* (2006.01)

(52) U.S. Cl.
    CPC ....... *G06K 9/00342* (2013.01); *G06K 9/6256* (2013.01); *G06K 9/6269* (2013.01); *G06K 9/6279* (2013.01); *G06N 20/00* (2019.01); *G06N 20/10* (2019.01)

(58) Field of Classification Search
    USPC ...................................................... 706/15, 45
    See application file for complete search history.

(56) References Cited

U.S. PATENT DOCUMENTS

| | | | |
|---|---|---|---|
| 2015/0273704 A1 | 10/2015 | Inaba et al. | |
| 2017/0228520 A1* | 8/2017 | Kidd | G06F 19/3481 |
| 2017/0286916 A1* | 10/2017 | Skiba | B25J 9/1689 |
| 2018/0307899 A1* | 10/2018 | Das | G06K 9/00885 |

FOREIGN PATENT DOCUMENTS

| | | |
|---|---|---|
| CN | 106503031 | 3/2017 |
| JP | 10-171926 | 6/1998 |
| JP | 2000-132514 | 5/2000 |
| JP | 2001-231765 | 8/2001 |
| JP | 2002-042137 | 2/2002 |
| JP | 2002-239953 | 8/2002 |
| JP | 2004-243472 | 9/2004 |
| JP | 2005-326996 | 11/2005 |
| JP | 2015-144026 | 8/2015 |
| JP | 2015-153143 | 8/2015 |
| JP | 2015-188990 | 11/2015 |
| JP | 2016-031704 | 3/2016 |
| JP | 2016-144051 | 8/2016 |
| JP | 2017-058850 | 3/2017 |

OTHER PUBLICATIONS

Office Action dated Oct. 31, 2019 in CN Patent Application No. 201810834920.1.

* cited by examiner

MACHINE LEARNING DEVICE AND USER IDENTIFICATION DEVICE

This application is based on and claims the benefit of priority from Japanese Patent Application No. 2017-146715, filed on 28 Jul. 2017, the content of which is incorporated herein by reference.

BACKGROUND OF THE INVENTION

Field of the Invention

The present invention relates to a machine learning device and a user identification device.

Related Art

Since an operation for operating a robot can lead to a severe accident, security such as limiting the content of an operation depending on an operator has been provided. In order to realize this, a technique of identifying an operator using a card or a USB terminal having ID information recorded therein, or a password and limiting an operation content according to the operator has been proposed.

For example, Patent Document 1 discloses a service providing system that generates right data including information on a right content and a use amount when using a network robot connected to a network, issuing a right ID for identifying the right data, and authenticating a user using a right ID input from a user terminal.

Patent Document 1: Japanese Unexamined Patent Application, Publication No. 2005-326996

SUMMARY OF THE INVENTION

However, in the invention according to Patent Document 1, there is a problem that it is not possible to secure safety when an ID card having ID information recorded therein is lended or a password is revealed.

Therefore, an object of the present invention is to provide a machine learning device capable of preventing spoofing of an operator to secure safety during an operation of a robot.

(1) A machine learning device (for example, a machine learning device 10 to be described later) according to the present invention is a machine learning device that constructs a learning model that performs user identification for authenticating an operator of a robot controller (for example, a controller 20 to be described later), the machine learning device including: an input data acquisition means (for example, an input unit 11 to be described later) that acquires, as input data, operation data including a measurement value related to a movement of at least a portion of a body of the operator and a shape of the body, detected when the operator is caused to perform a predetermined operation associated with a training operation panel (for example, a training operation panel 25 to be described later) of the robot controller; a label acquisition means (for example, a label acquisition unit 12 to be described later) that acquires identification information of the operator as a label; and a learning means (for example, a learning unit 13 to be described later) that constructs a learning model that performs user identification for authenticating operators of the robot controller by performing supervised learning using a pair of the input data and the label as training data.

(2) In the machine learning device (for example, a machine learning device 10 to be described later) according to (1), it is preferable that the training operation panel (for example, a training operation panel 25 to be described later) displays a guidance for the predetermined operation associated with the training operation panel of the robot controller (for example, a controller 20 to be described later) on a display (for example, a display 27 to be described later) included in the training operation panel.

(3) In the machine learning device (for example, a machine learning device 10 to be described later) according to (1) or (2), it is preferable that the predetermined operation associated with the training operation panel (for example, a training operation panel 25 to be described later) of the robot controller (for example, a controller 20 to be described later) includes an operation that the operator actually performs when using the training operation panel during operation.

(4) In the machine learning device (for example, a machine learning device 10 to be described later) according to any one of (1) to (3), it is preferable that the input data acquisition means (for example, an input unit 11 to be described later) acquires the feature amount obtained from the measurement value as the operation data.

(5) In the machine learning device (for example, a machine learning device 10 to be described later) according to (4), it is preferable that the feature amount is related to at least one of an operation order of the training operation panel (for example, a training operation panel 25 to be described later) detected by the training operation panel on the basis of the operation of the operator, a use frequency of each key switch (for example, a key switch 28 to be described later) included in the training operation panel, a use frequency of a deadman's switch (for example, a deadman's switch 29 to be described later) included in the training operation panel, a vibration detected by the training operation panel, an acceleration detected by the training operation panel, a body inclination during operation of the training operation panel, and a writing pressure detected by a touch panel of the training operation panel.

(6) In the machine learning device (for example, a machine learning device 10 to be described later) according to any one of (1) to (5), it is preferable that the input data acquisition means (for example, an input unit 11 to be described later) further acquires, as input data, operation data including a measurement value related to a movement of at least a portion of a body of the operator and a shape of the body, detected by an actual operation associated with the training operation panel (for example, a training operation panel 25 to be described later) of the operator during actual operation, and the label acquisition means (for example, a label acquisition unit 12 to be described later) further acquires identification information of the operator as a label, and the learning means (for example, a learning unit 13 to be described later) further updates the learning model by performing supervised learning using a pair of the input data and the label as training data.

(7) A user identification device (for example, a user identification device 30 to be described later) according to the present invention is a user identification device using the learning model constructed by the machine learning device (for example, a machine learning device 10 to be described later) according to any one of (1) to (6), the user identification device including: an operation data acquisition means (for example, an acquisition unit 31 to be described later) that acquires operation data including a measurement value related to a movement of at least a portion of a body of the operator and a shape of the body, detected by causing the operator to perform the predetermined operation associated with the training operation panel; and an operator identification means (for example, an identification unit 32 to be described later) that identifies the operator on the basis of the operation data and the learning model.

(8) In the user identification device (for example, a user identification device 30 to be described later) according to (7), it is preferable that the operation data acquisition means (for example, an acquisition unit 31 to be described later) further acquires operation data including a measurement value related to a movement of at least a portion of a body of the operator and a shape of the body when the operator is executing an actual operation associated with the training operation panel (for example, a training operation panel 25 to be described later) during actual operation, and the operator identification means (for example, an identification unit 32 to be described later) further determines whether identification information of the operator is correct or wrong on the basis of the operation data and the learning model.

(9) The user identification device (for example, a user identification device 30 to be described later) according to (7) or (8) is preferably incorporated into the training operation panel (for example, a training operation panel 25 to be described later) and is integrated with the training operation panel.

(10) A user identification device (for example, a user identification device 30 to be described later) according to the present invention includes: the machine learning device (for example, a machine learning device 10 to be described later) according to any one of (1) to (6); an operation data acquisition means (for example, an acquisition unit 31 to be described later) that acquires operation data including a measurement value related to a movement of at least a portion of a body of the operator and a shape of the body, detected by causing the operator to perform the predetermined operation associated with the training operation panel (for example, the training operation panel 25 to be described later); and an operator identification means (for example, an identification unit 32 to be described later) that identifies the operator on the basis of the operation data and the learning model constructed by the machine learning device.

(11) A user identification system (for example, a user identification system 100 to be described later) according to the present invention includes: the user identification device (for example, a user identification device 30 to be described later) according to (7) or (8); the machine learning device (for example, a machine learning device 10 to be described later); the robot controller (for example, a controller 20 to be described later); and the training operation panel (for example, a training operation panel 25 to be described later).

(12) In the user identification system (for example, a user identification system 100 to be described later) according to (11), it is preferable that the robot controller (for example, a controller 20 to be described later) further includes an operation invalidating means (for example, an operation invalidating unit 23 to be described later) that invalidates an operation associated with the training operation panel (for example, a training operation panel 25 to be described later) when the operator identification means (for example, an identification unit 32 to be described later) determines that identification information of the operator is wrong.

(13) In the user identification system (for example, a user identification system 100 to be described later) according to (11) or (12), it is preferable that the robot controller (for example, a controller 20 to be described later) further includes an alarm means (for example, an alarm unit 24 to be described later) that outputs an alarm when the operator identification means (for example, an identification unit 32 to be described later) determines that identification information of the operator is wrong.

(14) In the user identification system (for example, a user identification system 100 to be described later) according to any one of (11) to (13), it is preferable that when the operator identification means (for example, an identification unit 32 to be described later) could not determine whether identification information of the operator is correct or wrong, the machine learning device (for example, a machine learning device 10 to be described later) constructs a new learning model using new operation data which can be used for calculating a feature amount associated with a physical difference of an operator, and the operator identification means identifies the operator again on the basis of new operation data and a new learning model.

According to the present invention, it is possible to prevent spoofing of an operator and to secure safety during an operation of a robot.

DETAILED DESCRIPTION OF THE INVENTION

First Embodiment

Figure 1:
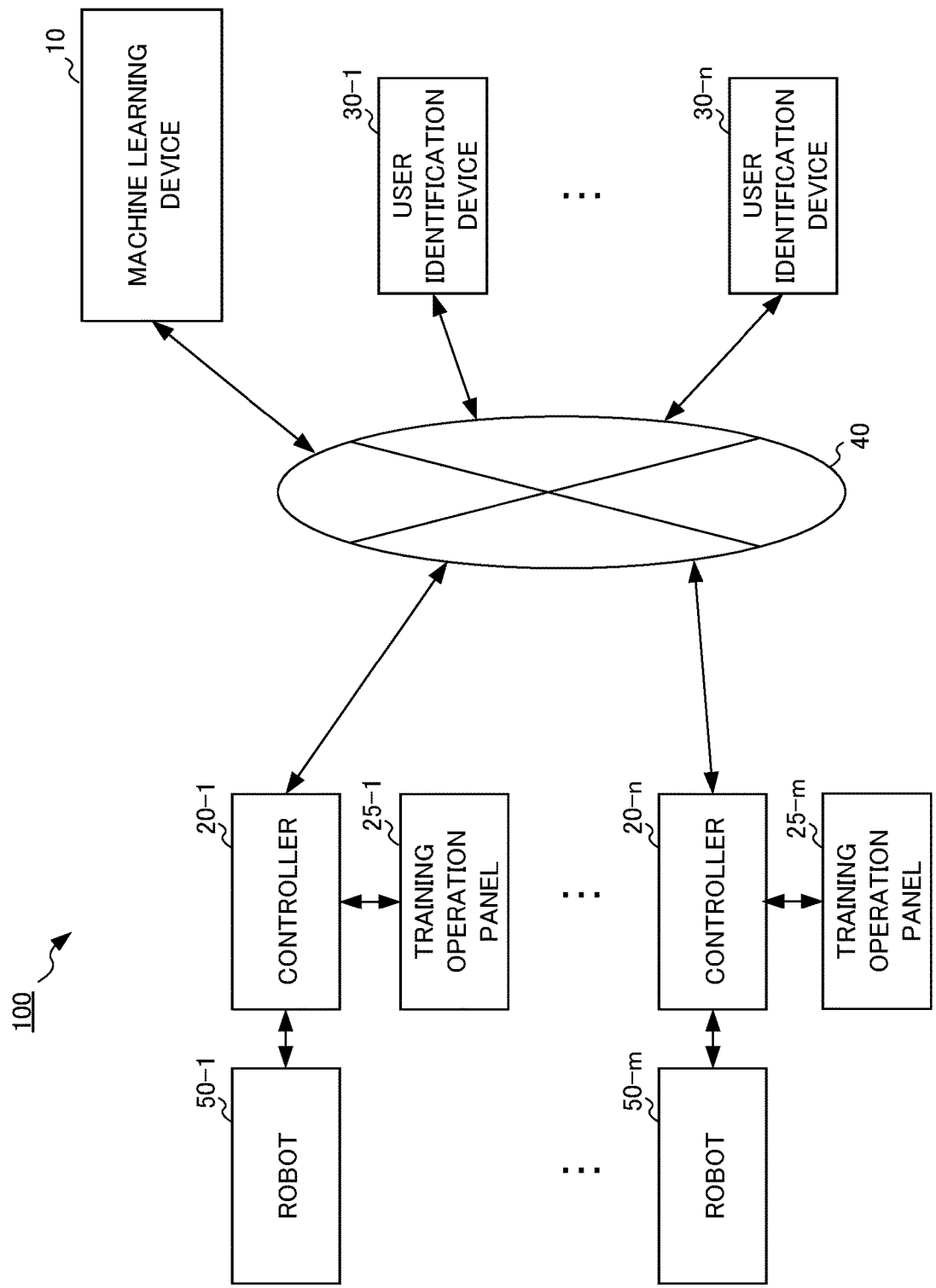
FIG. 1 is a block diagram illustrating a user identification system according to a first embodiment of the present invention.
Figure 2:
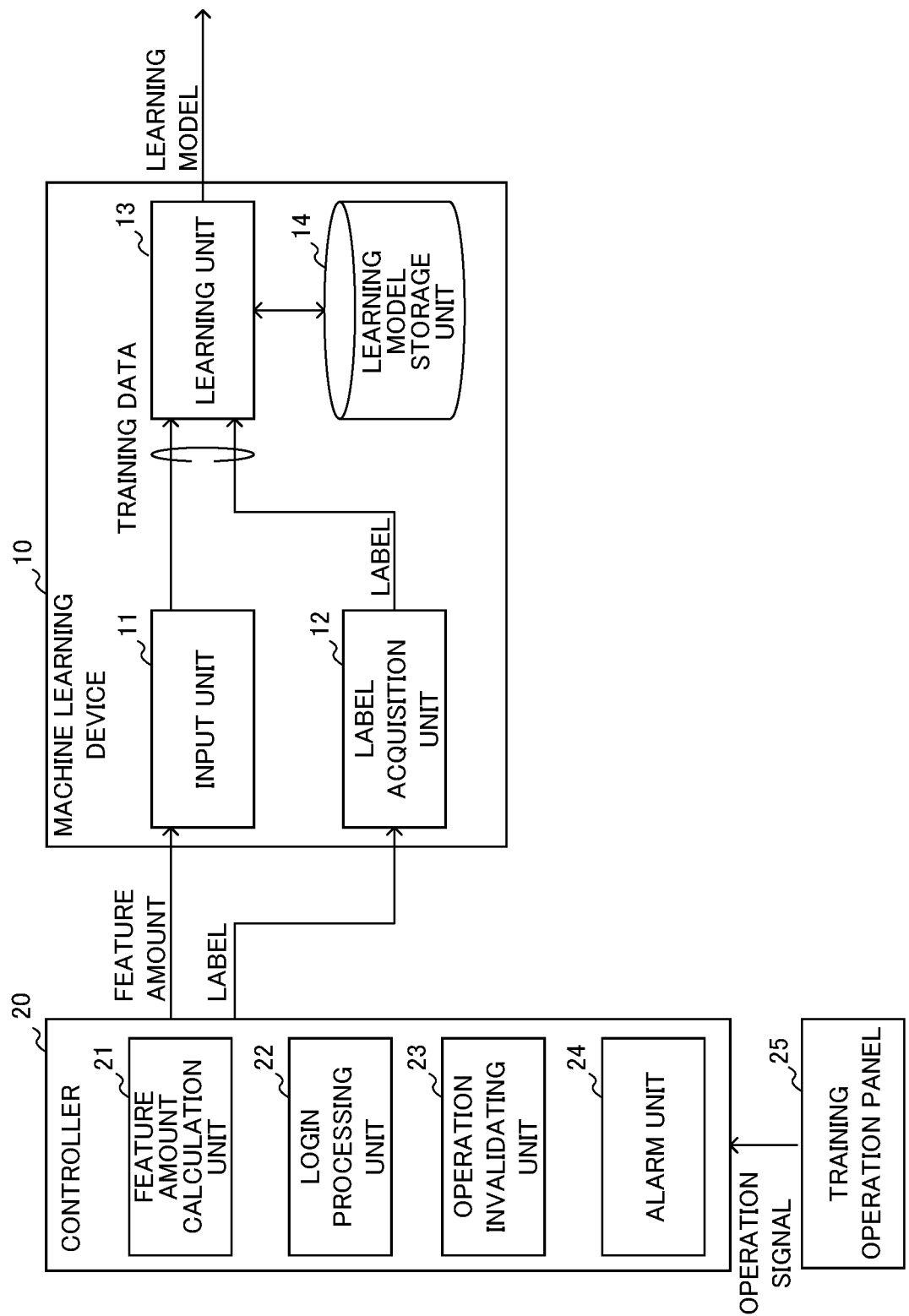
FIG. 2 is a block diagram illustrating the details of a machine learning device and a controller according to the first embodiment of the present invention.
Figure 3:
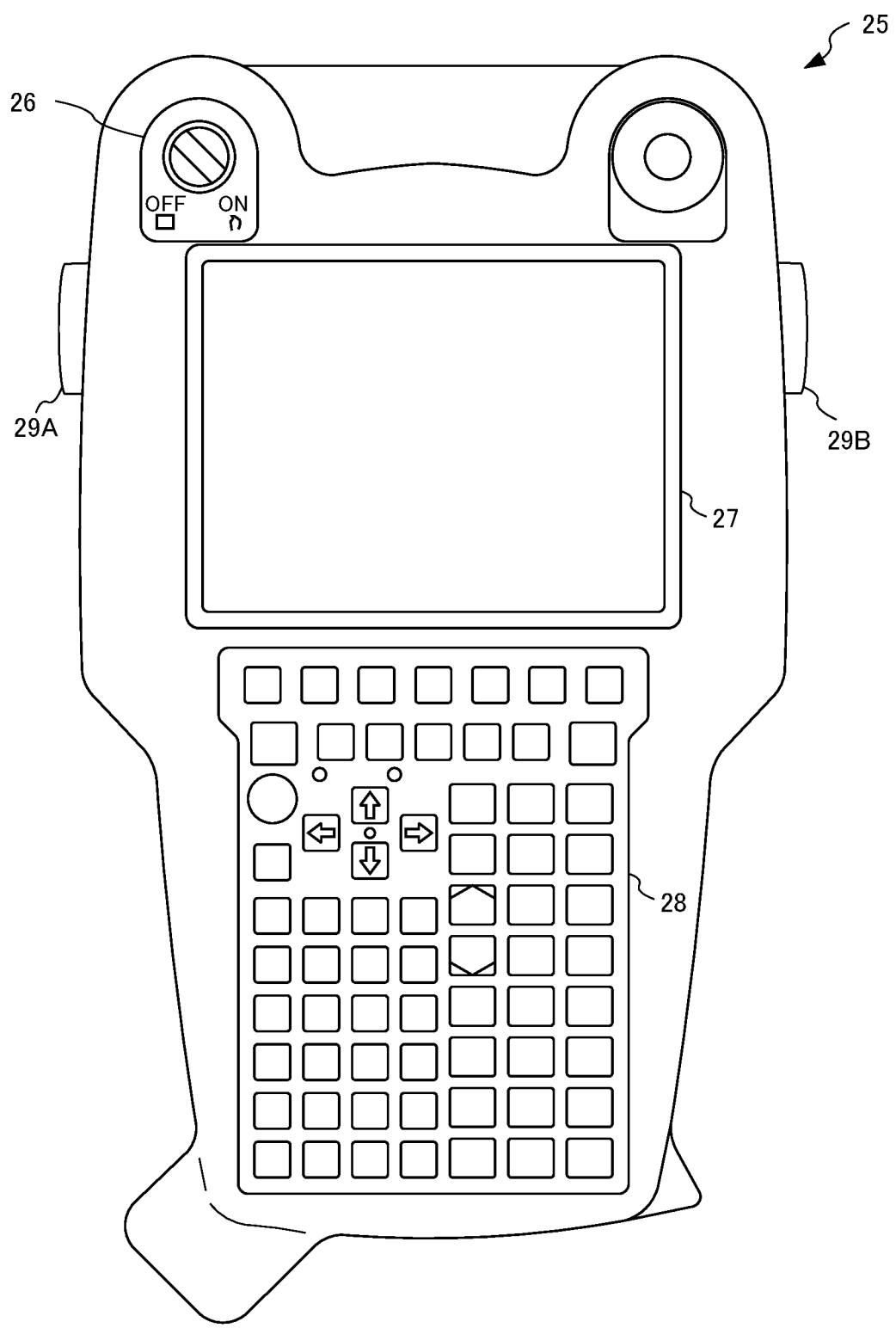
FIG. 3 is a diagram illustrating a configuration example of a training operation panel according to the first embodiment of the present invention.
Figure 4:
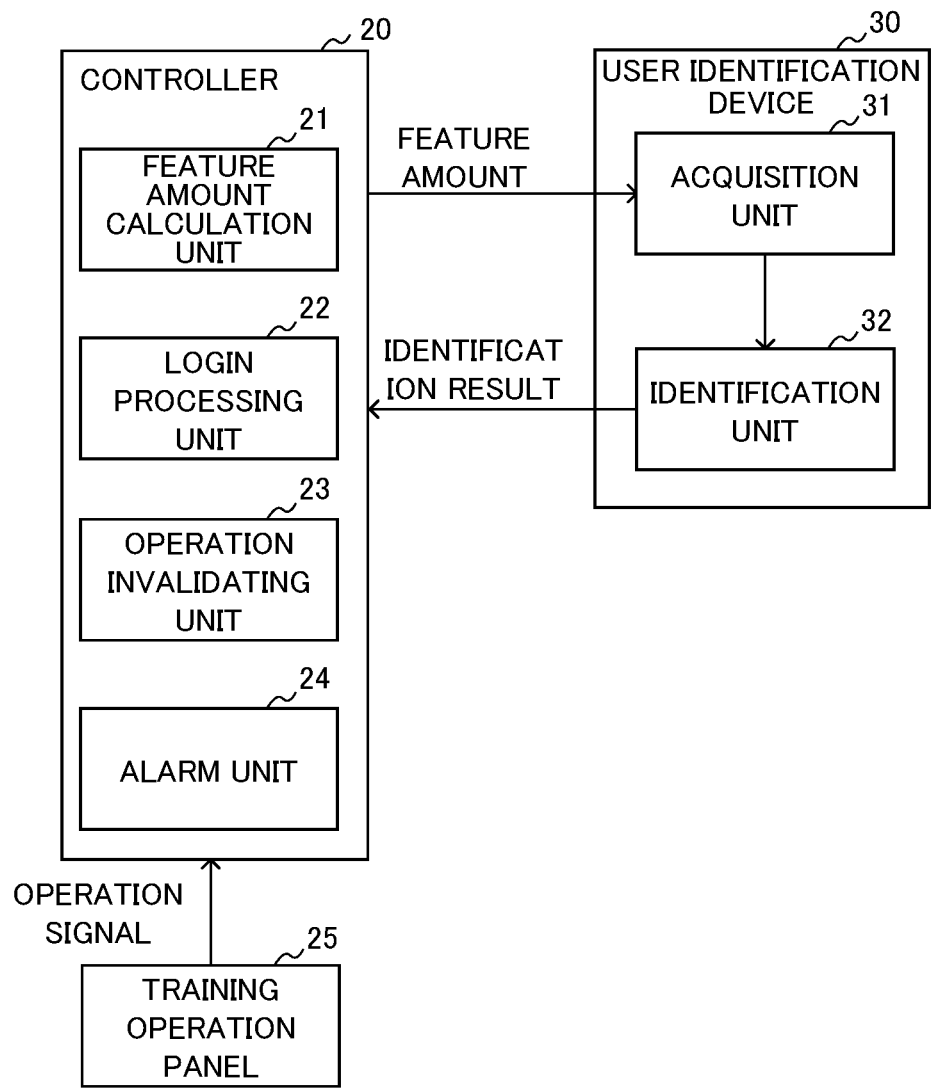
FIG. 4 is a block diagram illustrating the details of a user identification device and the controller according to the first embodiment of the present invention.

Hereinafter, a first embodiment of the present invention will be described with reference to the drawings. FIG. 1 is a block diagram illustrating a user identification system 100 according to a first embodiment of the present invention. FIG. 2 is a block diagram illustrating the details of a machine learning device 10 and a controller 20 according to the first embodiment of the present invention. FIG. 3 is a diagram illustrating a configuration example of a training operation panel 25 according to the first embodiment of the present invention. FIG. 4 is a block diagram illustrating the details of mainly a user identification device 30 and the controller 20 according to the first embodiment of the present invention.

<Configuration of User Identification System 100>

First, a configuration of a user identification system 100 according to the present embodiment will be described. As illustrated in FIG. 1, the user identification system 100 includes a machine learning device 10, m controllers 20, m training operation panels 25, n user identification devices 30, and m robots 50. m and n are arbitrary natural numbers.

The controller 20 transmits a control signal to the robot 50 to control the robot 50 to perform a predetermined operation. The controller 20 may be a general-purpose computer in which a program for the robot 50 is installed and a dedicated computer.

The robot 50 operates with a control signal from the controller 20 and performs an automated operation serving as an agent operation of an operator with a certain extent of autonomy.

The functions and the configuration of the machine learning device 10, the training operation panel 25, and the user identification device 30 will be described later with reference to FIGS. 2 to 4.

Here, the controller 20, the training operation panel 25, and the robot 50 are paired in a one-to-one relation and are communicably connected. A plurality of pairs of the controller 20, the training operation panel 25, and the robot 50 may be disposed in the same plant, for example, and may be disposed in different plants, respectively.

The machine learning device 10, the controller 20, and the user identification device 30 are communicably connected. The machine learning device 10, the controller 20, and the user identification device 30 may be connected directly via a connection interface and may be connected via a network 40. The network 40 is a local area network (LAN) constructed in a plant, the Internet, a public telephone network, or a combination thereof, for example. A specific communication method of the network 40, whether the network 40 is cable connection or wireless connection, and the like are not particularly limited.

Next, the functions of these devices included in the user identification system 100 will be described with reference to FIGS. 2 to 4. Here, FIG. 2 is a block diagram mainly illustrating functional blocks included in the machine learning device 10 and the controller 20 and the flow of data during machine learning. Since the respective controllers 20 have equivalent functions, only one controller is illustrated in FIG. 2. Similarly, the training operation panels 25 have equivalent functions, only one training operation panel 25 is illustrated in FIG. 2. Moreover, the network 40 present between the respective devices is not illustrated.

The training operation panel 25 is a device that an operator operates to train the robot 50, for example, when operating the robot 50 in an automatic mode. The training operation panel 25 transmits an operation signal to the controller 20 on the basis of an operation from an operator.

FIG. 3 illustrates a configuration example of the training operation panel 25. The training operation panel 25 mainly includes a power switch 26, a display 27, a key switch 28, and left and right deadman's switches 29A and 29B. The power switch 26 is a switch that switches supply of electric power from an external power supply to the training operation panel 25. The display 27 is realized as a touch panel that displays a guidance and monitor values of the robot 50 to an operator who uses the training operation panel 25. The key switch 28 is a switch for allowing an operator to input instructions on operations of the robot 50. The deadman's switches 29A and 29B are emergency stop switch mechanisms. During a normal operation, an operator applies a predetermined range of pressing force to any one of the deadman's switches 29A and 29B. In an emergency, an operator strongly presses any one of the deadman's switches 29A and 29B, whereby the robot 50 stops operating. Alternatively, the robot 50 may stop operating when an operator detaches his or her hands from both deadman's switches 29A and 29B.

As illustrated in FIG. 2, the controller 20 includes a feature amount calculation unit 21, a login processing unit 22, an operation invalidating unit 23, and an alarm unit 24.

The feature amount calculation unit 21 calculates a feature amount from an operation signal input from the training operation panel 25. More specifically, an operator operates the training operation panel 25 according to a guidance of operations displayed on the display 27 of the training operation panel 25. When an operator operates the training operation panel 25 for the first time, the operator may perform a prescribed operation in the presence of a person in charge of management. Preferably, this operation is a routine operation conducted before an operator performs an actual operation and includes the contents of all operations when an operator uses the training operation panel actually and an operation time is close to the time on which an operator operates the training operation panel actually. The feature amount calculation unit 21 calculates a feature amount from the measurement values of operation signals associated with these operations and transmits the feature amount to the machine learning device 10. Specifically, the feature amount is related to at least one of an operation order of the training operation panel 25 detected by the training operation panel 25, a use frequency of the key switches 28, a use frequency of the deadman's switches 29A and 29B, a vibration detected by the training operation panel 25, an acceleration detected by the training operation panel 25, a body inclination during operation of the training operation panel 25, and a writing pressure detected by the display 27. Even when the same operation is performed, if the operators are different, the use method of the key switches 28 and the deadman's switches 29A and 29B is different depending on an operator. For example, the number of times an expert presses on the key switch is different from that of a non-expert. More specifically, an expert presses on a key switch a small number of times whereas a non-expert presses on the key switch redundantly. Moreover, since the deadman's switches 29A and 29B are positioned on the left and right sides of the training operation panel 25, there is a bias in the switches used depending on whether the operator is left-handed or right-handed. Since a learning model is constructed by the method to be described later using the fact that the feature of these operations is different depending on an operator, the feature amount calculation unit 21 calculates a feature amount obtained from the measurement values of operation signals associated with these operations.

The functions of the login processing unit 22, the operation invalidating unit 23, and the alarm unit 24 will be described later with reference to FIG. 4.

The machine learning device 10 constructs a learning model for authenticating an operator of the controller 20 of the robot 50 by supervised machine learning. Due to this, as illustrated in FIG. 2, the machine learning device 10 includes an input unit 11, a label acquisition unit 12, a learning unit 13, and a learning model storage unit 14.

The input unit 11 acquires a feature amount from the feature amount calculation unit 21 of the controller 20. The label acquisition unit 12 acquires a label which is identification information of an operator. The learning unit 13 constructs a learning model that performs user identification for authenticating an operator of the controller 20 by performing supervised learning using a pair of the feature amount and label as training data and transmits the constructed learning model to the identification unit 32 of the user identification device 30 to be described later. The learning model storage unit 14 stores the learning model constructed by the learning unit 13.

The learning unit 13 can be realized using a support vector machine (hereinafter also referred to as "SVM"). SVM is a known technique and the detailed description thereof will be omitted. SVM is one of identification methods which use supervised learning (learning in which correct answer data and incorrect answer data are given as training data) and is known as a learning model having an excellent identification performance. For example, it is known that SVM obtains high identification performance (high generalization performance) with respect to non-learning data. The learning unit 13 uses a two-valued label associated with whether a feature amount corresponds to a specific operator as the label and calculates a hyperplane that divides a space including the feature amount in relation to whether a feature amount corresponds to a specific operator so that a maximum margin is obtained. Furthermore, the learning unit 13 can use the coefficient of this hyperplane as a parameter of a learning model that the user identification device 30 to be described later uses for user identification. For example, when three operators of A, B, and C are present as an operator to be registered in the controller 20, a label of "A" and a label of "Not A" are used as labels acquired by the label acquisition unit 12. Furthermore, the learning unit 13 calculates a hyperplane which divides feature amount data groups of three operators A, B, and C depending on whether an operator corresponds to a label of "A" (a positive example) or corresponds to a label of "Not A" (a negative example) and in which the distance to feature amount data present closest to the feature amount data group of "A" and the distance to feature amount data present closest to a feature amount data group of "Not A" are maximized. The learning unit 13 can constructs a learning model that identifies whether an operator is "A" or "Not A" using the coefficients of the hyperplane. Similarly, the learning unit 13 can construct a learning model that identifies whether an operator is "B" or "Not B" using the same feature amount data group and labels of "B" and "Not B". Moreover, the learning unit 13 can construct a learning model that identifies whether an operator is "C" or "Not C" using the same feature amount data group and labels of "C" and "Not C". That is, when the learning unit 13 is realized using the SVM, the learning unit 13 constructs three learning models corresponding to A, B, and C in order to identify A, B, and C.

The learning model storage unit 14 stores the learning model constructed by the learning unit 13 as described above. Particularly, when the learning unit 13 is realized using the SVM, the learning model storage unit 14 stores a number of learning models corresponding to the number of operators to be identified.

FIG. 4 is a block diagram illustrating mainly functional blocks included in the user identification device 30 and the controller 20 and the flow of data during user identification.

The user identification device 30 identifies whether an operator who is performing an operation associated with the training operation panel 25 corresponds to a specific operator registered in advance. Due to this, as illustrated in FIG. 4, the user identification device 30 includes an acquisition unit 31 and an identification unit 32.

The acquisition unit 31 causes an operator to perform an operation displayed as a guidance on the display 27 of the training operation panel 25 similarly to the input unit 11 to thereby acquire a feature amount calculated by the feature amount calculation unit 21 of the controller 20 from the operation signal input from the training operation panel 25. As described above, this operation is a routine operation performed before an operator performs an actual operation and preferably includes the contents of all operations when an operator actually uses the training operation panel, and the operation time is close to the time on which an operation operates the training operation panel actually.

The identification unit 32 identifies whether an operator who performed an operation associated with the training operation panel 25 is an operator registered in advance using the feature amount acquired by the acquisition unit 31 and the learning model acquired from the learning unit 13 of the machine learning device 10 and transmits an identification result to the controller 20. Although one identification unit 32 is illustrated in FIG. 4 for simplicity's sake, when the learning unit 13 of the machine learning device 10 is realized using the SVM as described above, a number of identification units 32 corresponding to the number of operators registered in advance are present. Specifically, when three pre-registered operators of A, B, and C, for example, are present, three identification units 32 in total, including an identification unit 32A that identifies whether an operator who performed an operation associated with the training operation panel 25 is A, an identification unit 32B that identifies whether the operator is B, and an identification unit 32C that identifies whether the operator is C are necessary. In this case, first, the identification unit 32A identifies whether an operator who performed an operation is identical to A using the operation data. Subsequently, the identification unit 32B identifies whether the operator who performed an operation is identical to B using the operation data. Finally, the identification unit 32C identifies whether the operator who performed an operation is identical to C using the operation data. In this way, it is possible to identify to which one of A, B, and C the operator who performed an operation is identical.

As described above, the controller 20 includes the login processing unit 22, the operation invalidating unit 23, and the alarm unit 24 in addition to the feature amount calculation unit 21.

The login processing unit 22 performs a login process to the controller 20, of an operator who performed an operation displayed as a guidance on the display 27 of the training operation panel 25 on the basis of an identification result received from the identification unit 32 of the user identification device 30. More specifically, the login processing unit 22 authorizes a login of the operator upon receiving an identification result indicating that the identification information of the operator is right from the identification unit 32 of the user identification device 30. On the other hand, the login processing unit 22 does not authorize a login of the operator upon receiving an identification result indicating that the identification information of the operator is wrong from the user identification device 30.

The operation invalidating unit 23 invalidates an operation associated with the training operation panel 25 upon receiving an identification result indicating that the identification information of the operator is wrong from the identification unit 32 of the user identification device 30. In this way, the operator cannot perform an operation associated with the training operation panel 25.

The alarm unit 24 outputs an alarm upon receiving an identification result indicating that the identification information of the operator is wrong from the user identification device 30.

<Operation During Machine Learning>

Figure 5:
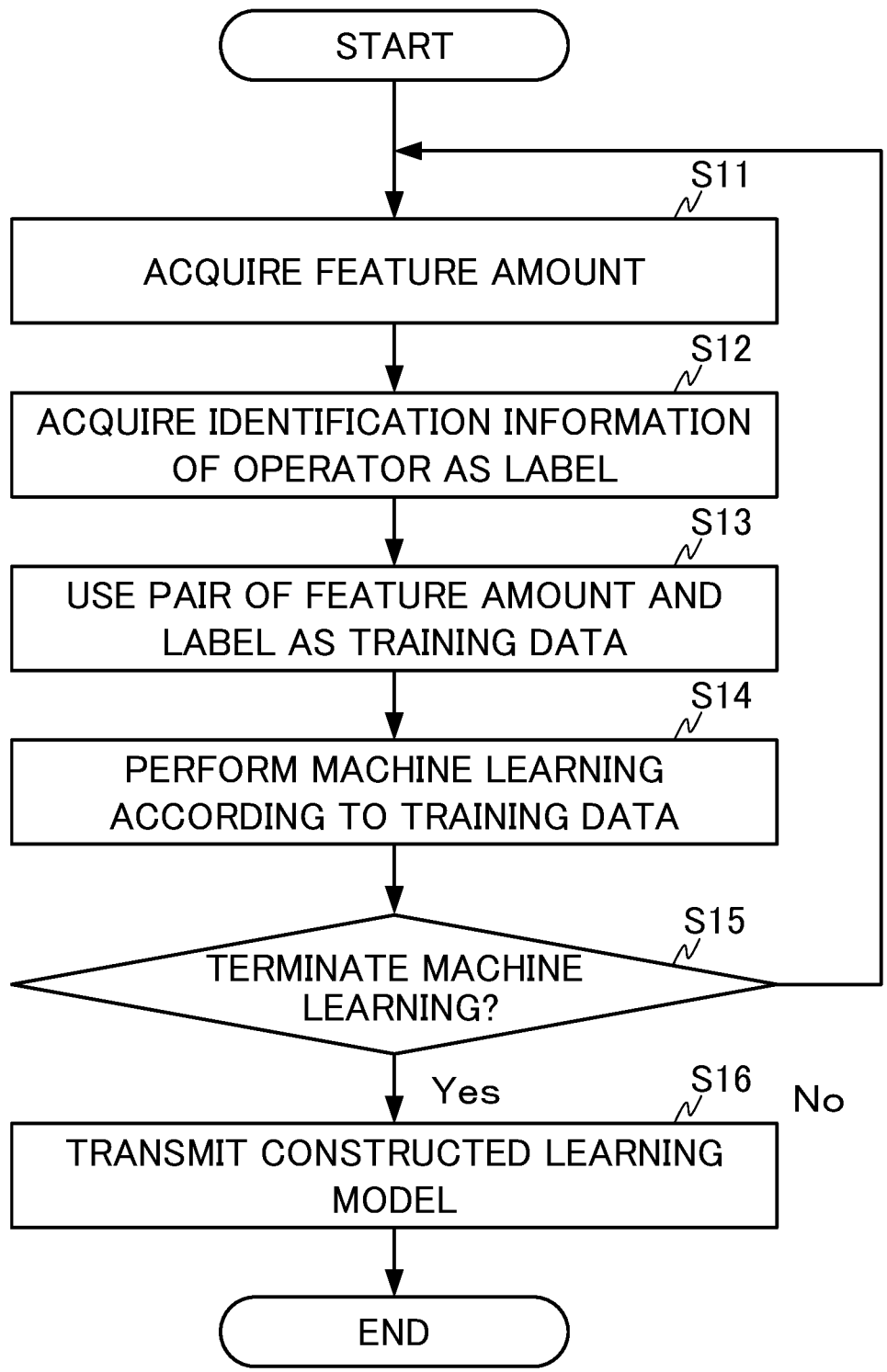
FIG. 5 is a flowchart illustrating an operation during machine learning of the user identification system according to the first embodiment of the present invention.

Next, the operation during machine learning of the user identification system 100 according to the present embodiment will be described. FIG. 5 is a flowchart illustrating the operation of the machine learning device 10 during machine learning.

In step S11, the input unit 11 of the machine learning device 10 acquires a feature amount from the feature amount calculation unit 21 of the controller 20. More specifically, the input unit 11 acquires a feature amount calculated by the feature amount calculation unit 21 from the operation signal when the operator operated the training operation panel 25 according to the operation guidance displayed on the display 27 of the training operation panel 25.

In step S12, the label acquisition unit 12 of the machine learning device 10 acquires a label which is the identification information of an operator.

In step S13, the learning unit 13 of the machine learning device 10 receives a pair of the feature amount and label as training data.

In step S14, the learning unit 13 of the machine learning device 10 executes machine learning using the training data.

In step S15, the learning unit 13 of the machine learning device 10 determines whether machine learning is to be terminated or machine learning is to be repeated. Here, a condition for terminating the machine learning can be determined arbitrarily. For example, the machine learning may be terminated when machine learning is repeated for a predetermined number of times.

Here, when the machine learning is repeated, the process returns to step S11 and the machine learning device 10 performs the same operation. On the other hand, when the machine learning is terminated, the machine learning device 10 transmits the learning model constructed by the machine learning by that time point to the respective user identification devices 30 via the network 40 in step S16.

The learning model storage unit 14 of the machine learning device 10 stores the learning model. In this way, when a learning model is requested from a newly provided user identification device 30, it is possible to transmit learning model to the user identification device. When new training data is acquired, machine learning may be further performed with respect to a learning model.

<Operation During User Identification>

Figure 6:
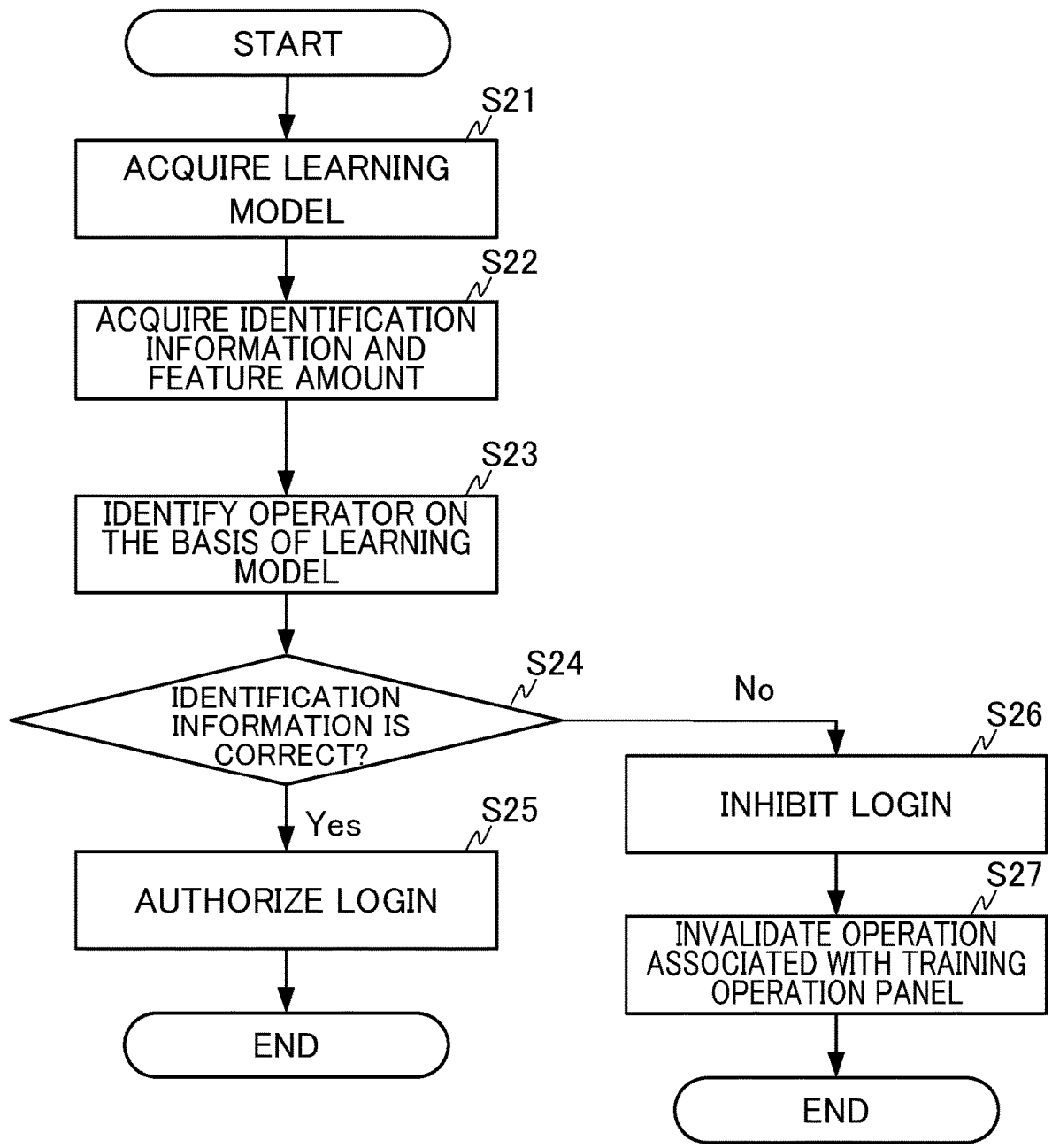
FIG. 6 is a flowchart illustrating an operation during machine user identification of the user identification system according to the first embodiment of the present invention.

Next, an operation during user identification of the user identification system 100 according to the present embodiment will be described. FIG. 6 is a flowchart illustrating the operation of the user identification device 30 during user identification.

In step S21, the identification unit 32 of the user identification device 30 acquires a learning model by receiving the learning model constructed by the machine learning device 10 via the network 40.

In step S22, the acquisition unit 31 of the user identification device 30 acquires identification information and feature amounts from the controller 20. More specifically, the acquisition unit 31 acquires the feature amount calculated from the operation signal when an operator operated the training operation panel 25 according to an operation guidance displayed on the display 27 of the training operation panel 25 together with the identification information.

In step S23, the identification unit 32 of the user identification device 30 identifies an operator on the basis of the feature amount and the learning model constructed by the machine learning device 10.

In step S24, when the identification information is correct (S24: YES), the process proceeds to step S25. When the identification information is wrong (S24: NO), the process proceeds to step S26.

In step S25, the login processing unit 22 of the controller 20 receives an identification result indicating that the identification information is correct from the identification unit of the user identification device 30 and authorizes a login of the operator.

In step S26, the login processing unit 22 of the controller 20 receives an identification result indicating that identification information is wrong from the identification unit of the user identification device 30 and does not authorize a login of the operator.

In step S27, the operation invalidating unit 23 of the controller 20 invalidates an operation associated with the training operation panel 25. As a result, the operator cannot perform an operation associated with the training operation panel 25.

In step S27, instead of or in addition to the operation invalidating unit 23 of the controller 20 invalidating an operation associated with the training operation panel 25, the alarm unit 24 of the controller 20 may output an alarm.

<Effects of First Embodiment>

As described above, in the present embodiment, the machine learning device 10 constructs a learning model that performs user identification for authenticating an operator of a robot controller from operation data including a measurement value related to a movement of at least a portion of a body of an operator and a shape of the operator, detected when the operator is caused to perform an operation associated with a training operation panel.

The user identification device 30 identifies an operator on the basis of the learning model constructed by the machine learning device 10.

In this respect, when the training operation panel 25 identifies an operator by machine-learning a feature amount changing depending on a method of handling the training operation panel 25 and extracting a pattern unique to an operator, it is possible to prevent spoofing of an operator and to secure safety of a robot's operation. Particularly, since the pattern is extracted from a method of handling the training operation panel 25 of the operator without requiring a camera, an ID reader, or the like in the training operation panel 25, an operator cannot disguise himself or herself easily.

Although the respective embodiments are preferred embodiments of the present invention, the scope of the present invention is not to be limited to the afore-mentioned respective embodiments, and the present invention can be modified in various ways without departing from the gist of the present invention.

<Modification 1>

In the present embodiment, an operation associated with the training operation panel 25 that an operator is caused to perform when authenticating an operator includes an operation associated with the training operation panel 25 when the operator actually operates the robot 50. However, the present invention is not limited thereto. An operator may be caused to perform an operation from which it is possible to identify a physical difference or the like of operators directly in addition to the operation associated with the training operation panel 25 when the operator actually operates the robot 50. More specifically, an operator may be caused to walk while carrying the training operation panel 25, for example. By doing so, vibration data of the training operation panel 25 measured by walking can be used as a feature amount indicating a stride of an operator. Moreover, an operator may be caused to stretch his or her arms while holding the training operation panel 25 to raise the training operation panel 25 above the head. Data of an inclination of the training operation panel 25 measured by this operation can be used as a feature amount indicating the length of the arms of the operator. Such an operation from which a physical difference or the like of an operator can be identified directly may be included in the aforementioned routine operation.

Learning may be performed on the basis of a learning model ("learning model_2") based on a feature amount obtained by adding an operation from which a physical difference or the like of an operator can be identified directly as well as a learning model ("learning model_1") based on a feature amount obtained from the aforementioned routine operation. By doing so, when the user identification device 30 could not identify an operator during login by "learning model_1" by causing an operator to perform the aforementioned routine operation, the user identification device 30 may perform an identification process in a stepwise manner so that an operator can be identified by "learning model_2" by causing the operator to further perform the aforementioned operation from which the physical difference or the like of the operator can be identified directly.

<Modification 2>

The learning unit 13 of the machine learning device 10, which is a component used during machine learning of the present embodiment is realized using a SVM which is a pattern identifier of two classes (Yes and No for correct and wrong). However, the present invention is not limited thereto. For example, supervised learning may be performed using a naive Bayes classifier, a neural network, boosting, or the like. Moreover, the SVM may be used for classifying data into a plurality of classes, and machine learning (for example, a neural network) which identifies and classifies data into a plurality of classes may be used. For example, when there are three operators of A, B, and C, the label acquisition unit 12 of the machine learning device 10 may acquire three labels of A, B, and C and the learning unit 13 may perform supervised learning using a pair of the feature amounts of the three operators A, B, and C and the three labels as training data to construct the learning model. In this case, the user identification device 30 has one identification unit 32 and this identification unit 32 determines whether the identification information of an operator is correct or wrong using one learning model.

<Modification 3>

Figure 7:
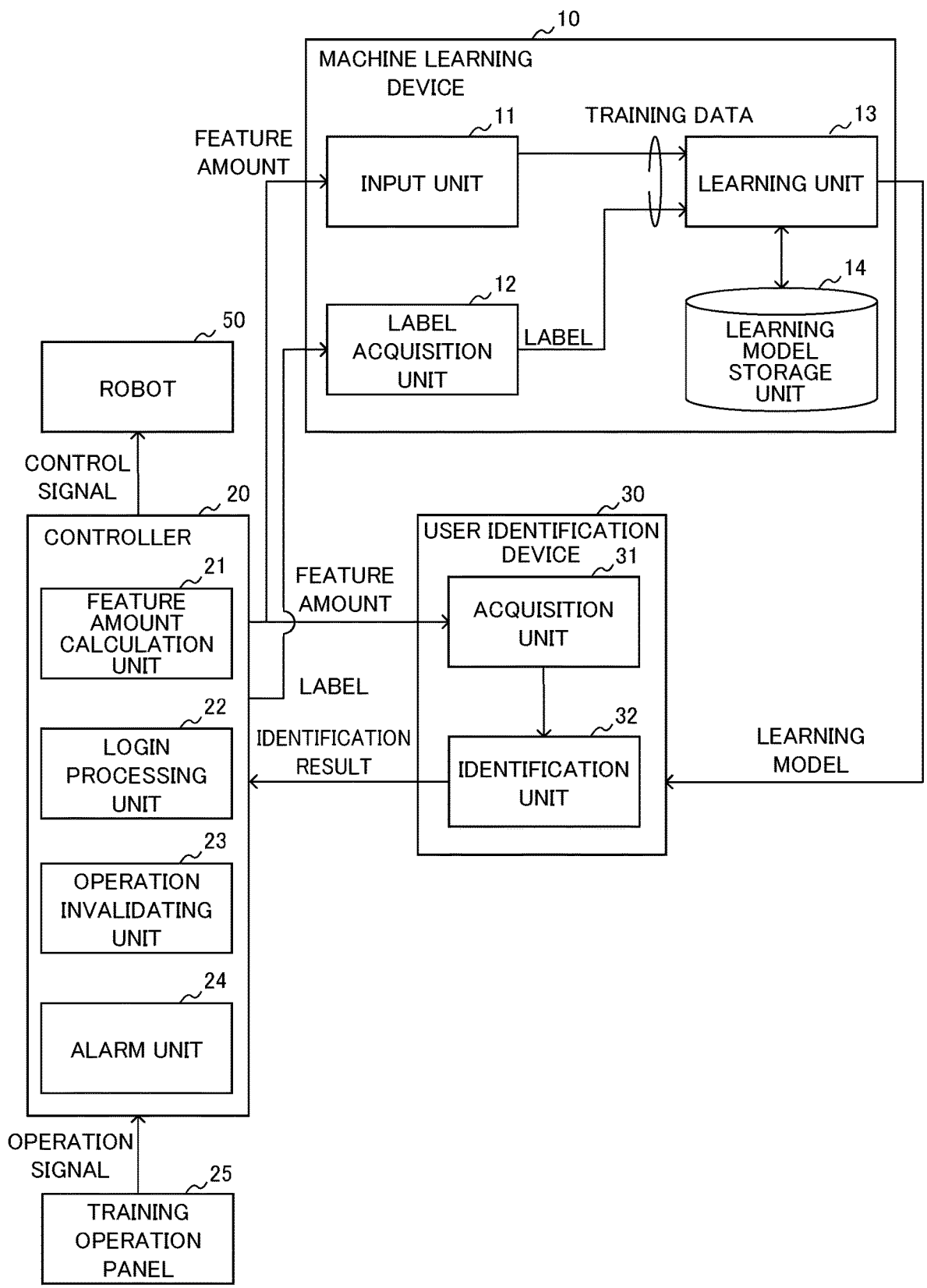
FIG. 7 is a block diagram illustrating the details of a machine learning device, a user identification device, and a controller according to another embodiment of the present invention.

As the training data used during machine learning of the present embodiment, the feature amount calculated from the measurement value of an operation signal associated with a predetermined routine operation, obtained by causing an operator to execute the routine operation during login (before an actual operation is authorized) is used as the label of the training data. However, the present invention is not limited thereto. For example, the machine learning device 10 may use the feature amount calculated on the basis of an actual operation associated with the training operation panel 25 of the operator after login (after an actual operation is authorized) as the label of the training data. FIG. 7 illustrates the flow of data between the machine learning device 10, the controller 20, and the user identification device 30 when the feature amount calculated on the basis of an actual operation is used as the label of training data. The machine learning device 10 has the same configuration as the machine learning device 10 illustrated in FIG. 2, the controller 20 has the same configuration as the controller 20 illustrated in FIGS. 2 and 4, and the user identification device 30 has the same configuration as the user identification device 30 illustrated in FIG. 4.

When an operator operates the robot 50 by operating the training operation panel 25, the feature amount calculation unit 21 of the controller 20 calculates a feature amount on the basis of the operation signal associated with this operation. The feature amount calculation unit 21 transmits the feature amount to the input unit 11 of the machine learning device 10. Since an operator is performing an actual operation, that is, the operator has logged in the controller 20, the label acquisition unit 12 of the machine learning device 10 acquires a label corresponding to an operator in operation. The learning unit 13 may be configured to update the learning model using the pair of the feature amount and label as training data. The learning unit 13 may transmit the updated learning model to the identification unit 32 of the user identification device 30. The identification unit 32 of the user identification device 30 can identify an operator using the updated learning model and the feature amount that the acquisition unit 31 has acquired from the feature amount calculation unit 21 of the controller 20. In this way, it is possible to update a pattern that identifies an operator when an operator operates the training operation panel 25 and to enhance the uniqueness of the pattern.

<Modification 4>

As an operation during user identification of the present embodiment, an operator is identified during login. However, the present invention is not limited thereto. For example, the feature amount calculation unit 21 of the controller 20 may calculate a feature amount from an operation signal generated by an operation associated with the training operation panel 25 when an operator operates the robot 50 during operation of the robot 50 after login (after an actual operation is authorized), the acquisition unit 31 of the user identification device 30 may acquire this feature amount, and the identification unit 32 of the user identification device 30 may execute a user identification process using this feature amount. For example, the feature amount calculation unit 21 may calculate a feature amount associated with an operator on the basis of a predetermined operation amount in the previous operations during operations of the operator after login and the identification unit 32 may identify an operator again using the feature amount. If the operator could not be authenticated as an authorized person during login, the operation invalidating unit 23 of the controller 20 may invalidate an operation associated with the training operation panel 25. In addition to or in an alternative to invalidating the operation associated with the training operation panel 25, the alarm unit 24 of the controller 20 may output an alarm. By doing so, for example, even if an operator who did spoofing during login was erroneously authenticated, since a personal habit or the like of the operator appears in an actual operation, it is possible to find out spoofing.

<Modification 5>

As a user identification operation during login of the present embodiment, the acquisition unit 31 of the user identification device 30 acquires the identification information (a user ID) of an operator and the identification unit 32 identifies whether the identification information (the user ID) is correct or wrong on the basis of the feature amount received from the controller 20. However, the present invention is not limited thereto. For example, as the user identification operation during login, the identification information (a user ID) of an operator may not be input. That is, the acquisition unit 31 of the user identification device 30 may not acquire the identification information (the user ID) of an operator and may identify the operator only on the basis of the feature amount received from the controller 20. The user identification device 30 may display an authentication result on the training operation panel 25 when the operator was authenticated as an operator A, for example. By doing so, it is possible to eliminate inputting of the user ID during login.

<Modification 6>

In the user identification system 100 of the present embodiment, the user identification device 30 is separated from the training operation panel 25 and the machine learning device 10. However, the present invention is not limited thereto. For example, the user identification device 30 and the training operation panel 25 may be realized as an integrated device as a configuration of the user identification system 100. Alternatively, the user identification device 30 and the machine learning device 10 may be realized as an integrated device. Alternatively, some or all of the functions of the machine learning device 10 may be realized by the controller 20. Alternatively, some or all of the functions of the user identification device 30 may be realized by the controller 20. In the embodiment, the machine learning device 10 has a function of performing learning and a function of storing a learning model. However, the function of performing learning and the function of storing a learning model may be performed by separate devices.

The respective devices included in the above-described user identification system 100 can be realized by hardware, software, or a combination thereof. Moreover, the user identification method performed by the respective devices included in the user identification system 100 can be realized by hardware, software, or a combination thereof. Here, being realized by software means being realized when a computer reads and executes a program.

The programs can be stored on any of various types of non-transitory computer readable media and be provided to a computer. The non-transitory computer readable media include various types of tangible storage media. Examples of the non-transitory computer readable media include a magnetic recording medium (for example a flexible disk, a magnetic tape, and a hard disk drive), a magneto-optical recording medium (for example a magneto-optical disk), a CD-ROM (Read Only Memory), a CD-R, a CD-R/W, a semiconductor memory (for example a mask ROM, a PROM (Programmable ROM), an EPROM (Erasable PROM), a flash ROM, and a RAM (Random Access Memory)). The programs may be provided to a computer by using any of various types of transitory computer readable media. Examples of the transitory computer readable media include electric signals, optical signals and electromagnetic waves. A transitory computer readable medium can provide programs to a computer through a wired communication path such as an electrical cable, optical fiber, or the like or a wireless communication path.

EXPLANATION OF REFERENCE NUMERALS

10: Machine learning device
11: Input unit
12: Label acquisition unit
13: Learning unit
14: Learning model storage unit
20: Controller
21: Feature amount calculation unit
22: Login processing unit
23: Operation invalidating unit
24: Alarm unit
25: Training operation panel
26: Power switch
27: Display
28: Key switch
29A, 29B: Deadman's switch
30: User identification device
31: Acquisition unit
32: Identification unit
50: Robot
100: User identification system

What is claimed is:

1. A machine learning device that constructs a learning model that performs user identification for authenticating an operator of a robot controller, the machine learning device comprising:
 a first memory;
 a processor, wherein the processor executes a program stored in the first memory to perform operations comprising:
 acquiring, as input data, operation data including a measurement value related to a movement of at least a portion of a body of the operator and a shape of the body, detected when the operator is caused to perform a predetermined operation associated with a training operation panel of the robot controller;
 acquiring identification information of the operator as a label; and
 constructing a learning model that performs user identification for authenticating operators of the robot controller by performing supervised learning using a pair of the input data and the label as training data,
 wherein the operations further include acquiring, as input data, a feature amount as operation data including a measurement value related to a movement of at least a portion of a body of the operator and a shape of the body, detected by an actual operation associated with the training operation panel of the operator during actual operation after an actual operation is authorized by login, and
 acquiring identification information of the operator as a label, and
 updating the learning model by performing supervised learning using a pair of the input data and the label as training data.

2. The machine learning device according to claim 1, wherein the training operation panel displays a guidance for the predetermined operation associated with the training operation panel of the robot controller on a display included in the training operation panel.

3. The machine learning device according to claim 1, wherein the predetermined operation associated with the training operation panel of the robot controller includes an operation that the operator actually performs when using the training operation panel during operation.

4. The machine learning device according to claim 1, wherein the operations further include acquiring the feature amount obtained from the measurement value as the operation data.

5. The machine learning device according to claim 4, wherein the feature amount is related to at least one of an operation order of the training operation panel detected by the training operation panel on the basis of the operation of the operator, a use frequency of each key switch included in the training operation panel, a use frequency of a deadman's switch included in the training operation panel, a vibration detected by the training operation panel, an acceleration detected by the training operation panel, a body inclination during operation of the training operation panel, and a writing pressure detected by a touch panel of the training operation panel.

6. A user identification device using the learning model constructed by the machine learning device according to claim 1, the user identification device comprising:

a second memory;

a second processor, wherein the second processor executes a program stored in the second memory to perform operations comprising:

acquiring operation data including a measurement value related to a movement of at least a portion of a body of the operator and a shape of the body, detected by causing the operator to perform the predetermined operation associated with the training operation panel; and identifying the operator on the basis of the operation data and the learning model.

7. The user identification device according to claim 6, wherein the operations further include:

acquiring operation data including a measurement value related to a movement of at least a portion of a body of the operator and a shape of the body when the operator is executing an actual operation associated with the training operation panel during actual operation, and determining whether identification information of the operator is correct or wrong on the basis of the operation data and the learning model.

8. The user identification device according to claim 6, wherein the user identification device is incorporated into the training operation panel and is integrated with the training operation panel.

9. A user identification device comprising:

the machine learning device according to claim 1;

a second memory;

a second processor, wherein the second processor executes a program stored in the second memory to perform operations comprising:

acquiring operation data including a measurement value related to a movement of at least a portion of a body of the operator and a shape of the body, detected by causing the operator to perform the predetermined operation associated with the training operation panel; and identifying the operator on the basis of the operation data and the learning model constructed by the machine learning device.

10. A user identification system comprising:

the user identification device according to claim 6;

the machine learning device;

the robot controller; and the training operation panel.

11. The user identification system according to claim 10, wherein the robot controller further includes an operation invalidating unit that invalidates an operation associated with the training operation panel when the identification information of the operator is determined to be wrong.

12. The user identification system according to claim 10, wherein the robot controller further includes an alarm unit that outputs an alarm when the identification information of the operator is determined to be wrong.

13. The user identification system according to claim 10, wherein the machine learning device constructs a new learning model using new operation data which can be used for calculating a feature amount associated with a physical difference of an operator, and the operations further include identifying the operator again on the basis of new operation data and a new learning model when a determination could not be made as to whether identification information of the operator is correct or wrong.

* * * * *